United States Patent
Munoz Utiel et al.

(10) Patent No.: US 11,930,147 B2
(45) Date of Patent: Mar. 12, 2024

(54) SYSTEM AND METHOD FOR AUTOMATIC IDENTIFICATION OF PHOTOCOPIED DOCUMENTS

(71) Applicant: SOTEC CONSULTING S.L., Madrid (ES)

(72) Inventors: Armando Munoz Utiel, Madrid (ES); David Gonzalez Garcia, Madrid (ES)

(73) Assignee: SOTEC CONSULTING S.L., Madrid (ES)

( * ) Notice: Subject to any disclaimer, the term of this patent is extended or adjusted under 35 U.S.C. 154(b) by 399 days.

(21) Appl. No.: 17/277,413

(22) PCT Filed: Sep. 26, 2018

(86) PCT No.: PCT/ES2018/070620
§ 371 (c)(1),
(2) Date: Mar. 18, 2021

(87) PCT Pub. No.: WO2020/065101
PCT Pub. Date: Apr. 2, 2020

(65) Prior Publication Data
US 2022/0038599 A1  Feb. 3, 2022

(51) Int. Cl.
*H04N 1/32* (2006.01)
*B42D 25/333* (2014.01)
*B42D 25/387* (2014.01)

(52) U.S. Cl.
CPC ......... *H04N 1/3216* (2013.01); *B42D 25/333* (2014.10); *B42D 25/387* (2014.10); *H04N 1/32203* (2013.01)

(58) Field of Classification Search
CPC ............. H04N 1/3216; H04N 1/32203; B42D 25/333; B42D 25/387

(Continued)

(56) References Cited

U.S. PATENT DOCUMENTS

| | | | | |
|---|---|---|---|---|
| 7,519,819 B2 * | 4/2009 | Bradley | ............. | H04N 1/32304 713/180 |
| 2002/0157005 A1 * | 10/2002 | Brunk | ................... | G06T 1/0071 713/176 |

(Continued)

FOREIGN PATENT DOCUMENTS

| | | | |
|---|---|---|---|
| CN | 102880999 B | * | 1/2015 |
| TW | 564376 B | * | 1/2003 |
| WO | 2008146262 A2 | | 12/2008 |

OTHER PUBLICATIONS

T. Manikyala Rao; An Optimized Approach for Fake Currency Etection Using Discrete Wavelet Transform; I.J.C.I ; year:2016; pp. 203-212.*

(Continued)

*Primary Examiner* — Monjur Rahim
(74) *Attorney, Agent, or Firm* — LUCAS & MERCANTI, LLP

(57) ABSTRACT

A system and method for automatic identification of photocopied documents is disclosed wherein the method is performed by capturing an image of a marked printed document; decoding a digital watermark embedded in the image, obtaining a mark identifier; recovering, by searching a database, at least one calibration parameter associated with the mark identifier; applying a discrete Fourier transform to the image, obtaining a frequency matrix; obtaining at least one maximum frequency value in the frequency matrix; comparing the at least one maximum frequency value with at least one calibration parameter; determining, on the basis of the comparison, if the marked printed document is an original document or a photocopied document.

16 Claims, 6 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 2003/0128861 A1* | 7/2003 | Rhoads | .............. | H04N 1/32304 |
| | | | | 707/E17.112 |
| 2003/0223584 A1* | 12/2003 | Bradley | ................ | G06T 1/0028 |
| | | | | 713/176 |
| 2008/0174101 A1* | 7/2008 | Fan | ........................ | G07D 7/206 |
| | | | | 283/70 |
| 2010/0014122 A1* | 1/2010 | Massicot | ............ | H04N 1/32208 |
| | | | | 358/3.28 |
| 2010/0080471 A1* | 4/2010 | Haas | .................. | H04N 1/32331 |
| | | | | 726/2 |
| 2010/0091336 A1* | 4/2010 | Bradley | ............. | H04N 1/32283 |
| | | | | 382/100 |
| 2010/0195894 A1* | 8/2010 | Lohweg | ................. | G07D 7/003 |
| | | | | 382/135 |
| 2011/0213700 A1* | 9/2011 | Sant'Anselmo | ....... | G06Q 20/10 |
| | | | | 235/487 |
| 2012/0043750 A1* | 2/2012 | Raz | .......................... | G07D 7/06 |
| | | | | 283/85 |
| 2012/0327450 A1* | 12/2012 | Sagan | .................. | G03G 21/046 |
| | | | | 358/1.14 |
| 2021/0019519 A1* | 1/2021 | Martin | .................. | G06F 18/217 |
| 2021/0124919 A1* | 4/2021 | Balakrishnan | ....... | G06V 30/418 |

OTHER PUBLICATIONS

J.K. Lee, et al; The complex cepstrum applied to two-dimensional images; Pattern Recognition; vol. 26; No. 10; May 4, 1993; pp. 1579-1592 (not available).
International Search Report for Corresponding International Application No. PCT/ES2018/070620 dated May 10, 2019 38 Pages.

* cited by examiner

SYSTEM AND METHOD FOR AUTOMATIC IDENTIFICATION OF PHOTOCOPIED DOCUMENTS

CROSS REFERENCE TO RELATED APPLICATION

This Application is a 371 of PCT/ES2018/070620 filed on Sep. 26, 2018, the contents of which is incorporated herein by reference.

FIELD OF THE INVENTION

The present invention falls within the field of systems and methods for automatic authentication of documents for verifying document fraud, and more specifically for the automatic identification of photocopied documents.

BACKGROUND OF THE INVENTION

In the area of counterfeiting, the use of non-original documents can lead to serious fraud problems. The use of paper copies of original confidential documents is the main channel of information leakage. The document replication of financial documents, either by photocopying or by scanning and subsequent printing, contributes to generating fraud in payments that are made.

In most cases, the document verification process is carried out manually. This entails a problem of high cost, due to personnel dedicated to manually analysing documents, and the possibility of human errors in the identification due to the subjectivity of the test.

Currently there are also photocopy identification systems that use the incorporation of semi-fragile watermarks in original documents. Said watermarks are lost when the document is replicated by means of the photocopying system. In this way, the identification of the document originality is conditioned only by the existence or absence of the mark. However, the loss of the digital watermark prevents maintaining the traceability of the document throughout its entire useful life, and it results in a loss of data and additional useful information included in the digital watermark itself.

The present invention solves the problem of fraud associated with document replication by photocopying and/or scanning and printing, enabling the automatic and instantaneous identification of manipulated documents, and thus preventing the use and acceptance of non-original documents (for example, used for payments, in the case of financial documents).

DESCRIPTION OF THE INVENTION

The invention relates to a system and method for automatic identification of photocopied documents. In the context of the present invention, the term "photocopied documents" includes photocopies of an original document and documents obtained by scanning an original document and the subsequent printing thereof.

The present invention enables photocopies to be automatically identified by analysing the parameters of the digital watermark and incorporating digital watermarks with ultraviolet ink (UV mark) as a second verification layer. Unlike current solutions, the present invention identifies a photocopied document without losing the digital watermark, and therefore maintains the traceability of the document throughout its entire useful life and the benefits that the digital watermark provides with respect to including data and information additional to what is visible in the document.

The implementation of the solution enables an original document to be instantly differentiated from a photocopied one. In addition, it adds value by automating the document verification process, which is reflected in the reduction of costs related to personnel dedicated to manually analysing documents, the elimination of errors due to human subjectivity, and the increase in efficiency, among others.

The method for automatic identification of photocopied documents comprises the following steps:
  Capturing an image of a marked printed document with a digital watermark.
  Obtaining, from the captured image, a calibration identifier.
  Recovering, by searching a database, a calibration threshold associated with the calibration identifier.
  Applying a discrete Fourier transform to the image, obtaining a frequency matrix.
  Obtaining at least one maximum frequency value in the frequency matrix.
  Comparing the at least one maximum frequency value with the calibration threshold.
  Determining, on the basis of the comparison, if the marked printed document is an original document or a photocopied document.

Obtaining the calibration identifier comprises, according to a preferred embodiment, decoding a digital watermark embedded in the image, obtaining a mark identifier, wherein the calibration identifier is the mark identifier. Alternatively, the calibration identifier can be other data included in the marked printed document itself which enables the calibration carried out to obtain a calibration identifier to be identified; for example, in a check the calibration identifier may be the check batch number. In this way, in the database the batch number can be correlated with the calibration carried out, obtaining the calibration threshold associated with said batch.

The photocopy identifier of the present invention is an automatic system that, by means of reading software installed in an image capturing device (scanner, mobile phone camera, etc.), is capable of recognising whether a document is an original or a copy (photocopied and/or scanned and printed, for example). The solution can be integrated with other document authenticity systems as an extra verification measure or it can work on its own in a device with reading capacity (scanner, mobile phone camera, etc.) when the aim is solely to identify a photocopy. The system works due to the encryption of digital watermarks at the time of printing the original document and/or the digital generation thereof. The reading software for the digital watermark is capable of detecting when the digital watermark is altered due to photocopying processes, thus alerting the user that the document they have is not the original.

The printing equipment accesses digital watermark embedding software and calibration software after capturing the image. The embedding software marks the documents to be printed and keeps track of which digital watermarks have been used. The calibration software is used when the printing parameters are changed to calibrate the system, with a minimum of five documents. In the event of requiring highly accurate detection, it is advisable to carry out a calibration for each batch of documents.

At the document reception/verification points, the reading software for digital watermarks is implemented by means of a scanner or by means of a mobile device (e.g., mobile phone). After scanning the documents, the software decrypts the embedded digital watermarks and verifies the parameters of the digital watermark, specifically a frequency analysis is performed on the image. This data is compared to that registered in the database at the time of calibration. By analysing and comparing these parameters, the system is able to automatically verify if they are within the threshold calculated at the time of calibration to determine whether it is an original or a photocopy. The software implemented in the scanner or in the mobile device generates a response that identifies whether the document being verified is a photocopy or an original document.

BRIEF DESCRIPTION OF THE DRAWINGS

What follows is a very brief description of a series of drawings that aid in better understanding the invention, and which are expressly related to an embodiment of said invention that is presented by way of a non-limiting example of the same.

DETAILED DESCRIPTION OF THE INVENTION

The present invention relates to a photocopy verification system based on an image frequency analysis, for identifying digital images that contain a digital watermark but have been exposed to a printing and digitisation process in order to obtain fraudulent copies of the same (photocopies and/or scanning and printing). In addition, to achieve a double verification of authenticity, there is the option of embedding a digital watermark with ultraviolet ink, UV mark, which, when analysing the document with a UV scanner and not finding the UV digital watermark, can identify the fraudulent copies.

The frequency being sought is the frequency at which the digital watermark saves the information. This frequency represents the number of pixels that the digital watermark uses to save information per unit of length. For example, in the event of having a digital watermark at a frequency of 75 in$^{-1}$, it means that the digital watermark uses 75 pixels per inch to save the information. For such identification, a pattern analysis mechanism is used on the pixels of the image which comprises:

Modifying the original image to be printed during the manufacturing process such that it exhibits high amplitude and low dispersion (bandwidth) in the marking frequency, and optionally printing a mark in UV ink, which will enable identifying whether the document was scanned or reprinted, since, at the time a document is replicated, the amplitude and dispersion vary due to the technological limitations of most types of printers on the market.

During the inspection and detection of the digital watermark on the digital image, verifying these frequencies by seeking the same amplitude and dispersion of the frequency that was applied in the printing phase. In the event that these parameters differ from the printing parameters, it is confirmed that this document is a photocopy. Also, in the case of photocopies, the UV digital watermark will most likely disappear, so that if the UV digital watermark is not found with a UV scan, it can be confirmed that the document is photocopied.

Figure 1A:
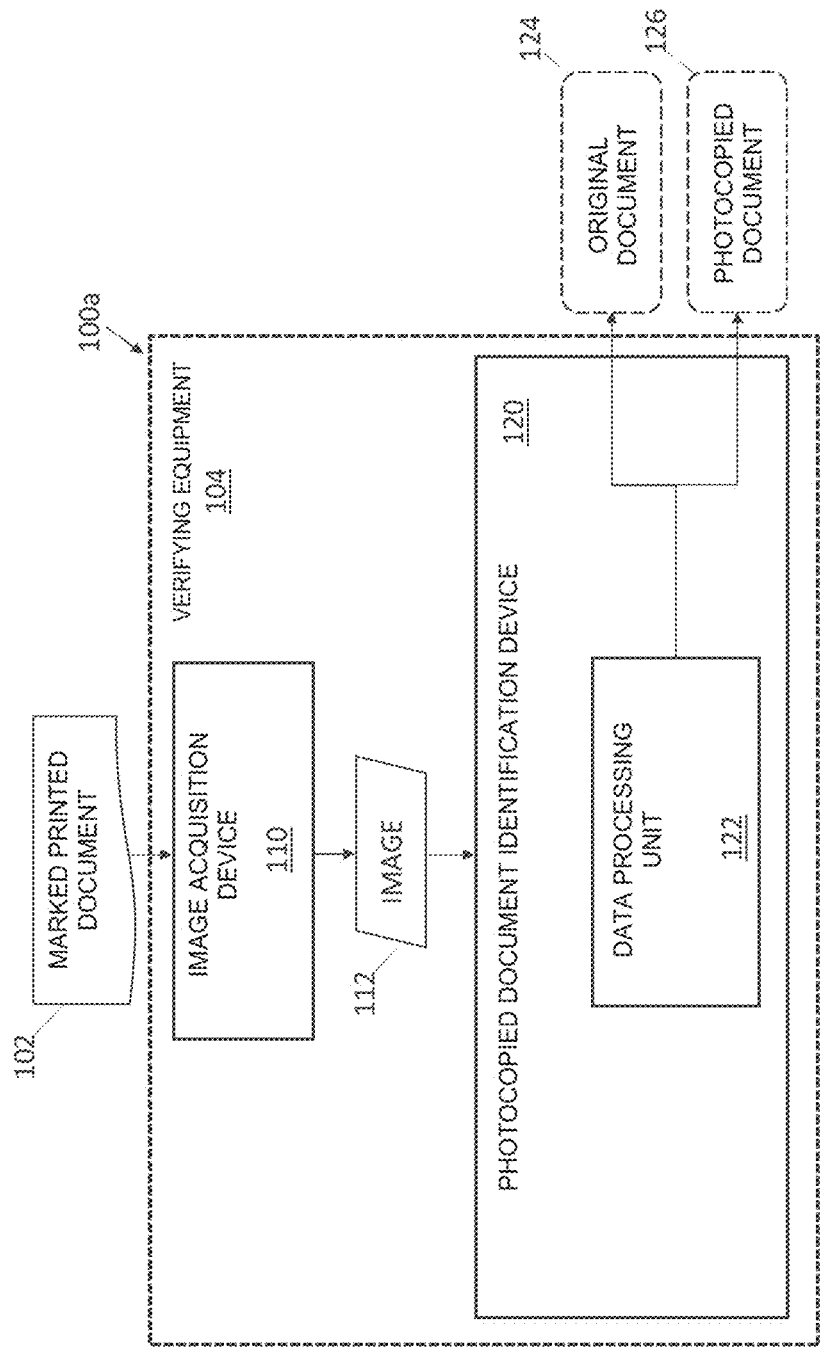
FIGS. 1A and 1B schematically show, according to two different embodiments of the present invention, the components of a system for automatic identification of photocopied documents.

FIG. 1A schematically represents the components involved in a system for automatic identification of photocopied documents 100a according to a possible embodiment. The system 100a comprises an image acquisition device 110 and a photocopied document identification device 120. Both devices can be grouped into a verifying equipment 104.

The image acquisition device 110 is responsible for capturing an image 112 of a marked printed document 102 to be verified. A data processing unit (122) of the photocopied document identification device 120 receives said image 112 and analyses it to determine whether the printed document is an original document 124 or a photocopied document 126.

The photocopied document identification device 120 may be, by way of example, a computer or any device with image computing and analysis capabilities. The image acquisition device 110 can be a scanner or a camera. In the embodiment shown in FIG. 1A, both devices (110, 120) are independent entities, which can be communicated by cable or wirelessly for sending and receiving the image 112. Alternatively, the image acquisition device 110 may store the image 112 in a memory (on a memory stick, on a remote server hard disk, etc.) which will subsequently be accessed by the photocopied document identification device 120.

Figure 1B:
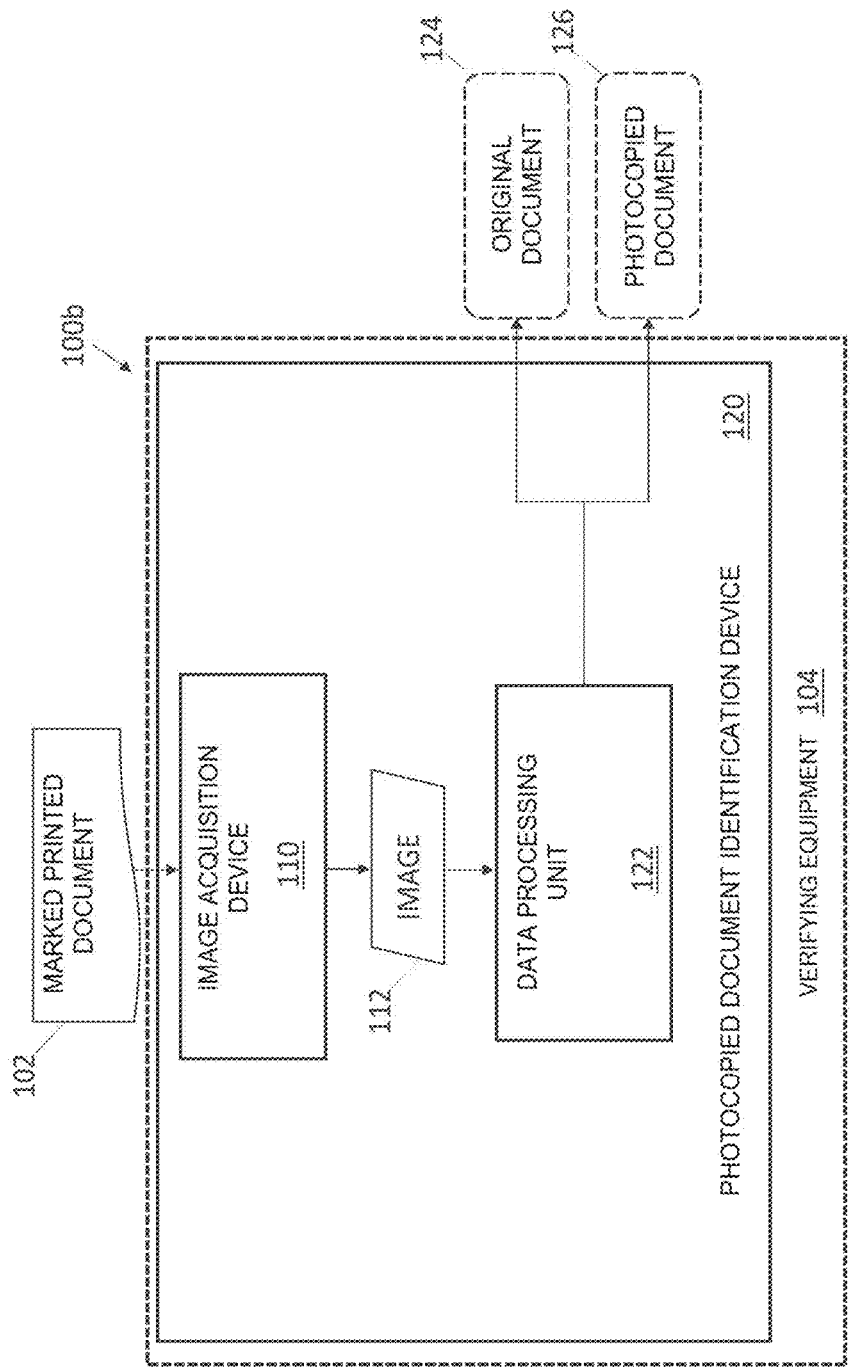

FIG. 1B shows another embodiment of a system for automatic identification of photocopied documents 100b. In this embodiment, the image acquisition device 110 forms part of the photocopied document identification device 120; in other words, said devices (110, 120) are not independent entities. For example, the photocopied document identification device 120 can be a mobile device (e.g., tablet, smartphone) and the image acquisition device 110 can be a camera of said mobile device.

Figure 2:
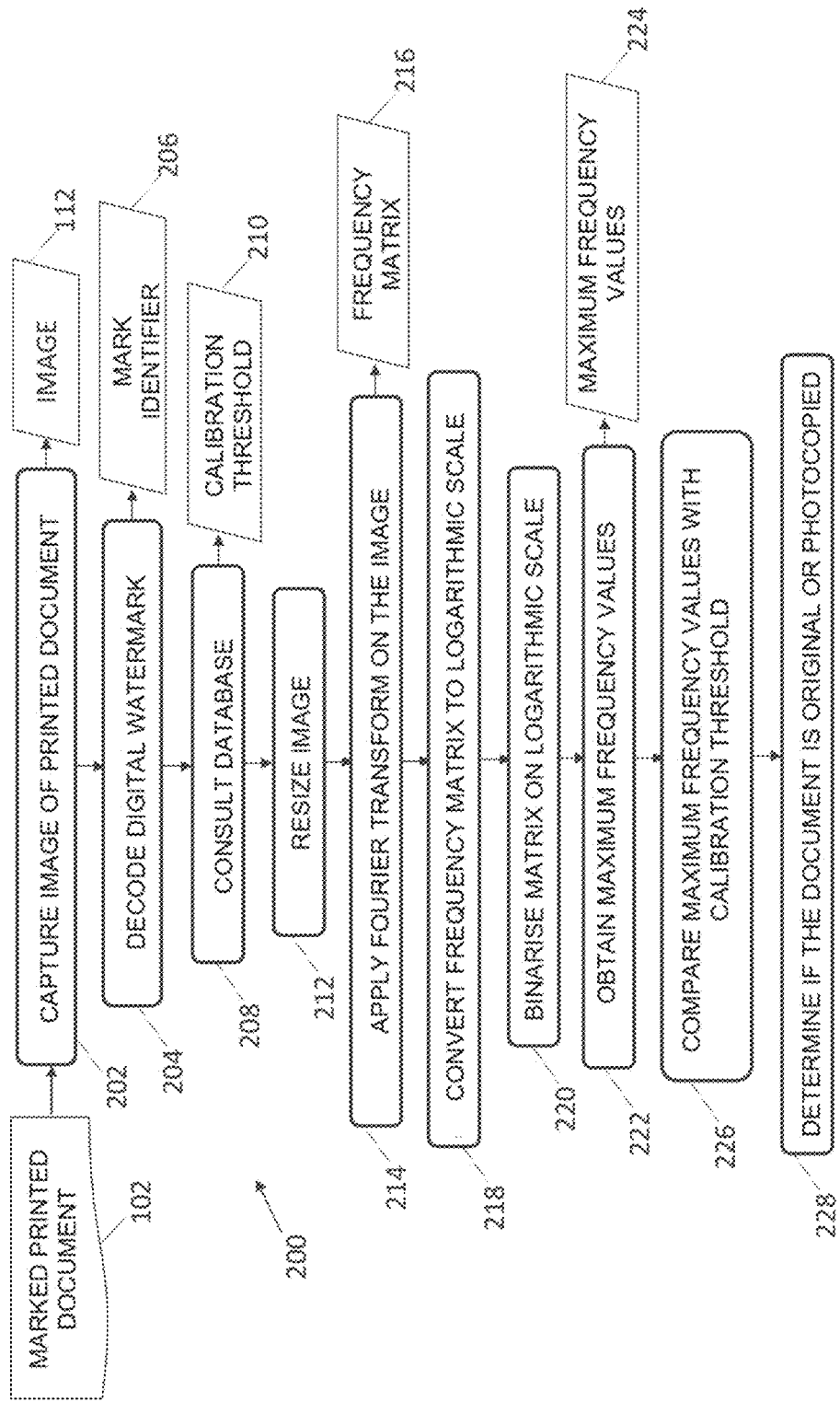
FIG. 2 illustrates a flow chart of a method for automatic identification of photocopied documents according to an embodiment of the present invention.

FIG. 2 represents a flow chart of a method for automatic identification of photocopied documents 200 according to a possible embodiment. The system (100a, 100b) for automatic identification of photocopied documents of FIGS. 1A and 1B is configured to execute the steps of the method 200. Particularly, the method 200 of FIG. 2 comprises the following steps:

Capturing 202 an image 112 of a marked printed document 102.

Identifying and decoding 204 a digital watermark embedded in the image, obtaining a mark identifier 206 (a unique identifier for each mark).

Recovering, by searching 208 a database, a calibration threshold 210 of the digital watermark associated with the mark identifier 206.

Applying 214 a discrete Fourier transform to the image, obtaining a frequency matrix 216.

Obtaining 222 one or more maximum frequency values 224 in the frequency matrix 216.

Comparing 226 one or more maximum frequency values 224 with the calibration threshold 210.

Determining 228, on the basis of the comparison, if the printed document is an original document 124 or a photocopied document 126.

According to the embodiment of FIG. 2, the method 200 may further comprise the step of converting 218 the frequency matrix 216 to a logarithmic scale, and binarising 220 the matrix converted to a logarithmic scale so that the matrix values above a certain binarisation threshold corresponds to maximum frequency values. The chosen binarisation threshold is preferably proportional to the matrix converted to a logarithmic scale (e.g., the selected binarisation threshold may be half the maximum value of the matrix). The method 200 may further comprise resizing 212 the image 112 to a certain size prior to applying 214 the discrete Fourier transform.

Figure 3:
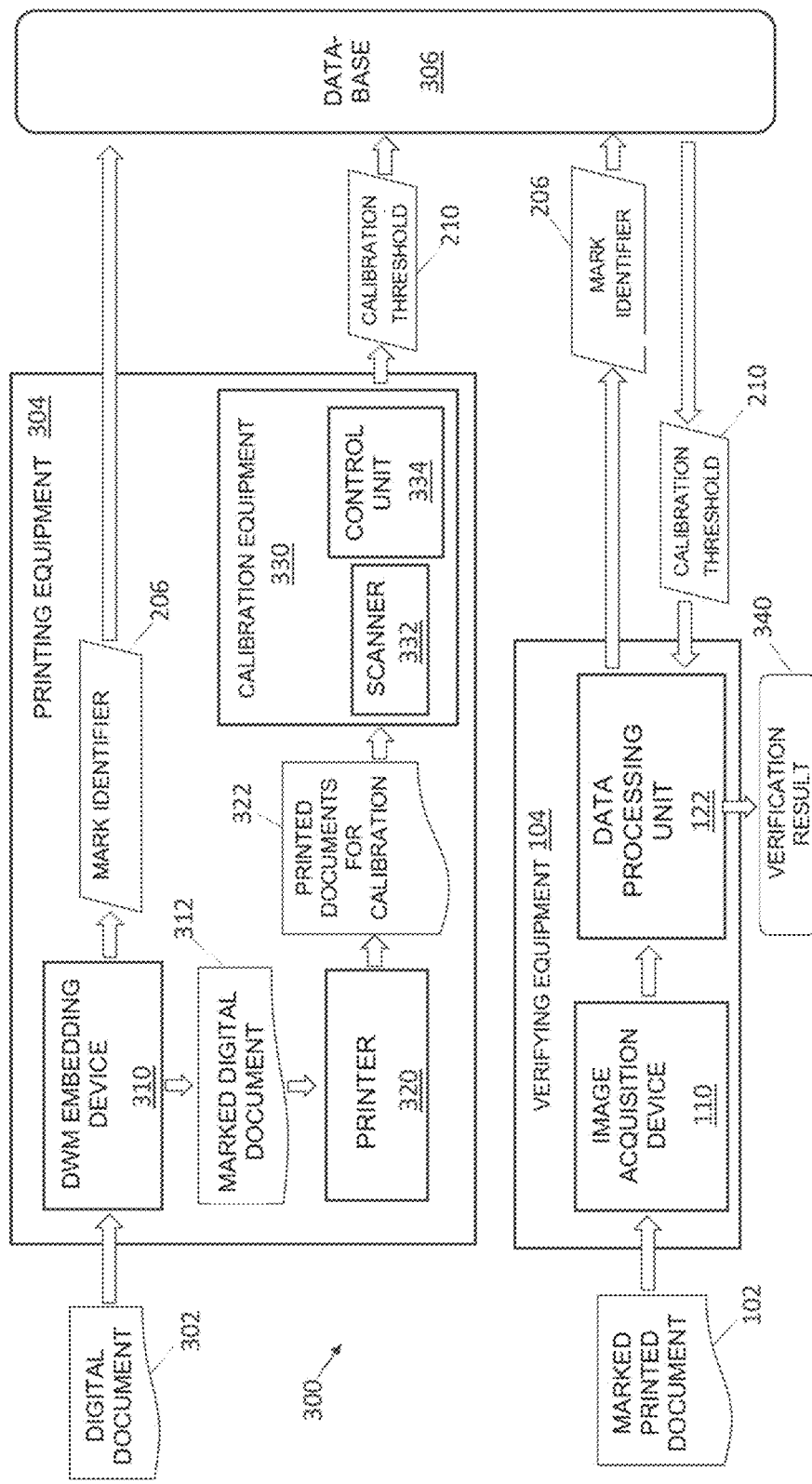
FIG. 3 schematically represents an embodiment of a system for automatic identification of photocopied documents.

FIG. 3 schematically shows an embodiment of a system for automatic identification of photocopied documents 300 which includes, in addition to verifying equipment 104 according to an embodiment of any of the preceding figures, printing equipment 304 and a database 306.

With respect to the printing equipment 304, a digital watermark embedding device 310 has processing means configured to insert a digital watermark into a digital document 302 to obtain a marked digital document 312. The digital watermark comprises at least one encoded mark identifier 206. The digital watermark embedding device 310 stores the mark identifier 206 in the database 306.

A printer 320 is responsible for printing the marked digital document 312, obtaining one or more printed documents for calibration 322. Calibration equipment 330 has a scanner 332, responsible for carrying out a calibration scan of the printed documents for calibration 322, and a control unit 334 (i.e., a data processing unit, such as for example a CPU) configured to limit the maximum marking frequency values obtained in the calibration scan to obtain a calibration threshold 210 and to store the calibration threshold 210 in the database 306, associating it with the corresponding mark identifier 206 thereof.

The verifying equipment 104 receives a marked printed document 102 to be verified. The data processing unit 122 executes the corresponding steps of the method 200 previously described in FIG. 2, recovering the mark identifier 206 embedded in the marked printed document 102, searching 208 the database 306 to recover the calibration threshold 210 associated with said mark identifier 206, and finally issuing a result of the verification 340, wherein it is determined 228 whether the printed document is an original document 124 or a photocopied document 126.

The digital watermark frequency analysis method, which comprises a diagnostic step and a previous calibration step, is explained in detail below, according to various preferred embodiments. The calibration step, carried out by the printing equipment 304, comprises:

Defining the marking frequency of the document, which depends on the resolution with which it will be printed and scanned. According to the Nyquist Theorem, the maximum frequency at which marking can be done must be the smallest value between half the printing resolution and half the scanning resolution. For example, if scanning is done at 300 DPI and printing at 600 DPI, the maximum marking frequency value is dictated by the scanning resolution, and this frequency would be 150 in$^{-1}$. In practice, the marking frequency is normally limited by the scanning resolution and the optimum frequency is the lower value between a quarter of the scanning resolution and a quarter of the printing resolution (in the example above it would be 75 in$^{-1}$).

Marking the document and printing it considering the aforementioned parameters.

Once the original document is printed, it must be scanned, which will enable the photocopying system to be calibrated. This calibration must be carried out every time the printing environment (machine, type of paper or ink) is changed. Calibration consists of limiting the values taken by the maximum marking frequency values in order to establish a threshold (calibration threshold 210) indicative of whether a document is original or, failing that, whether it is a photocopy. In one embodiment, the calibration threshold 210 is established assuming that the maximum values have a Gaussian distribution. From the maximum values obtained in the calibration scan, the mean x and the standard deviation σ of this value are obtained. The threshold of this maximum is then x±Nσ, N>0 where N determines the amplitude of the threshold. As an example, the value of N can be set to N=5, which ensures that 99.9999% of the measurements of an original document will be within this threshold. In cases where greater rigour of authenticity is required, the values of N that are normally used are: N=4.4 which ensures 99.999%, N=3.9 which ensures 99.99%, N=3.3 which ensures 99.9%, N=2.57 which ensures 99%. This percentage is not the probability of differentiating an original document from a photocopied one, but rather the probability of detecting an original document as such. This means that the higher the value of N, the more likely it is to infer false negatives, in other words, detecting a photocopied document as an original one. For this reason, in cases wherein a smaller margin of error is allowed in detection, the value of N will be lower.

Once the calibration thresholds have been defined, they are stored in a database 306 and associated with the number of the digital watermark (mark identifier 206) so that they are available at the time of document verification.

Once the calibration step has been completed, by which the calibration threshold 210 is obtained which enables detecting whether the document to be verified is original or only a photocopied one, the diagnostic step on a marked printed document 102 can now be started to determine the veracity of the same. The diagnostic step, carried out by the verifying equipment 104 and explained in the flow diagram of FIG. 2, comprises:

The first step in the print diagnosis is to scan the document. The image formats accepted for processing are those that are not compressed, or which have lossless compression, such as TIFF, BMP, PNG, JPEG 2000 (with 1:1 compression ratio, which is the highest quality available).

Decoding the digital watermark using software for reading and recovering the encoded information. With the number of the digital watermark, the calibration information is searched in the database.

Resizing the image so that the size exactly adapts to what is needed, a desired resolution being considered, for example 300 DPI, for which in the event of checks with dimensions of 160×70 mm and scanned at 300 DPI, the resizing would be carried out at 1889×827 pixels.

Once the readjusted image is obtained, a discrete Fourier transform is applied to it, preferably the fast Fourier transform (FFT). With this transform, the analysis values from the temporal (or spatial) domain are changed to the frequency domain. Thus, for a vector x with N elements with indices k=0, . . . , N−1, the FFT of x is defined as X such that:

$$X_k = \sum_{n=0}^{N-1} x_n e^{-i2\pi k \frac{n}{N}}, \quad k = 0, \ldots, N-1$$

To calculate the FFT of a two-dimensional matrix (i.e., image 112), the preceding formula is applied first to all the rows thereof, and then to all the columns thereof (or vice versa, i.e., first to the columns and then to the rows).

Next, the matrix data is put on a logarithmic scale to be able to process them and make them more representative when representing it, and in this way the coordinates can be obtained in which the significant points from which we will obtain the values to be analysed are located. This can be calculated by adding one unit to all the values in the image matrix and then calculating the natural (or Napierian) logarithm of each value.

Figure 4A:
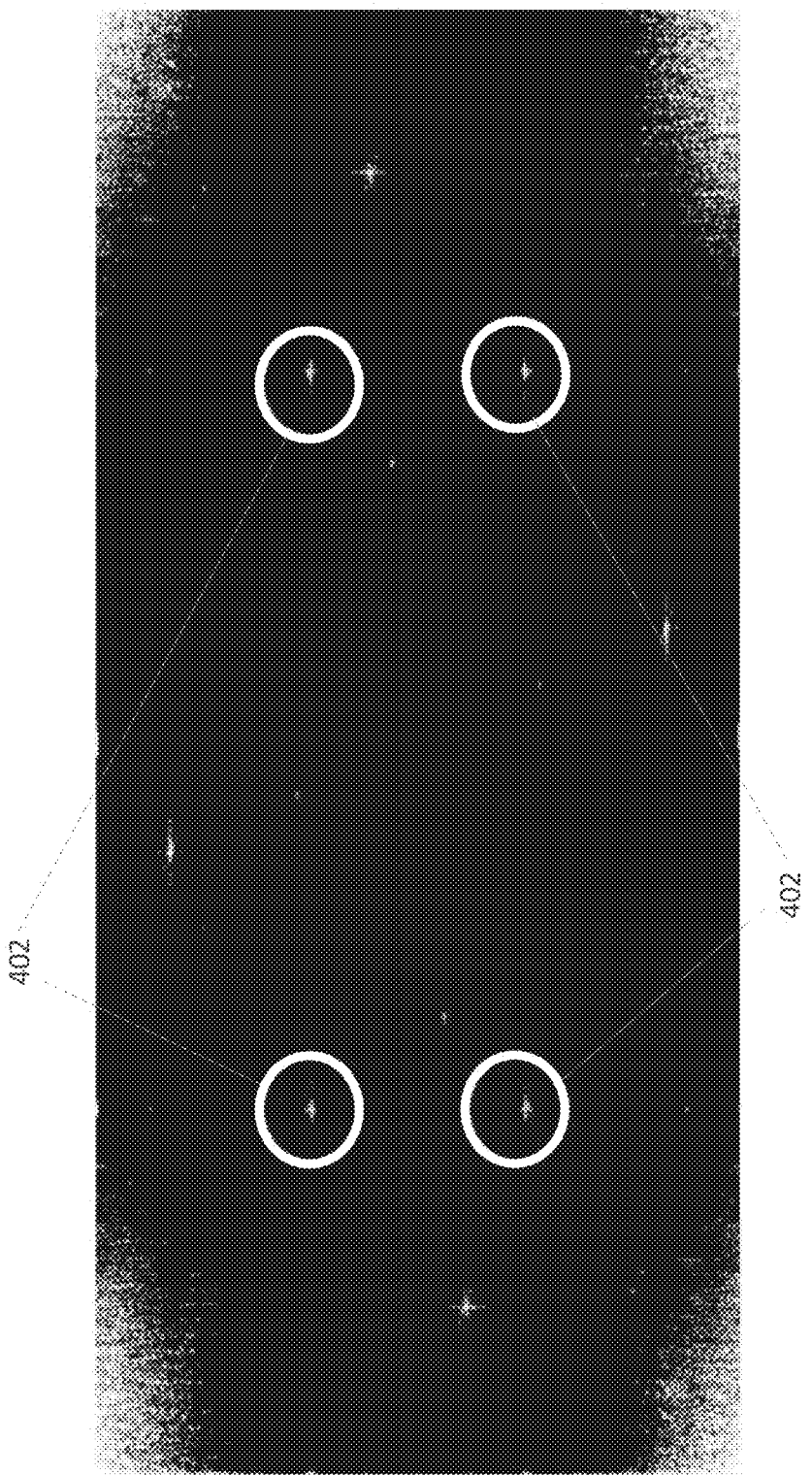
FIG. 4A shows the representation of the binarised frequency matrix of an original document, wherein the frequency maximums are shown.
Figure 4B:
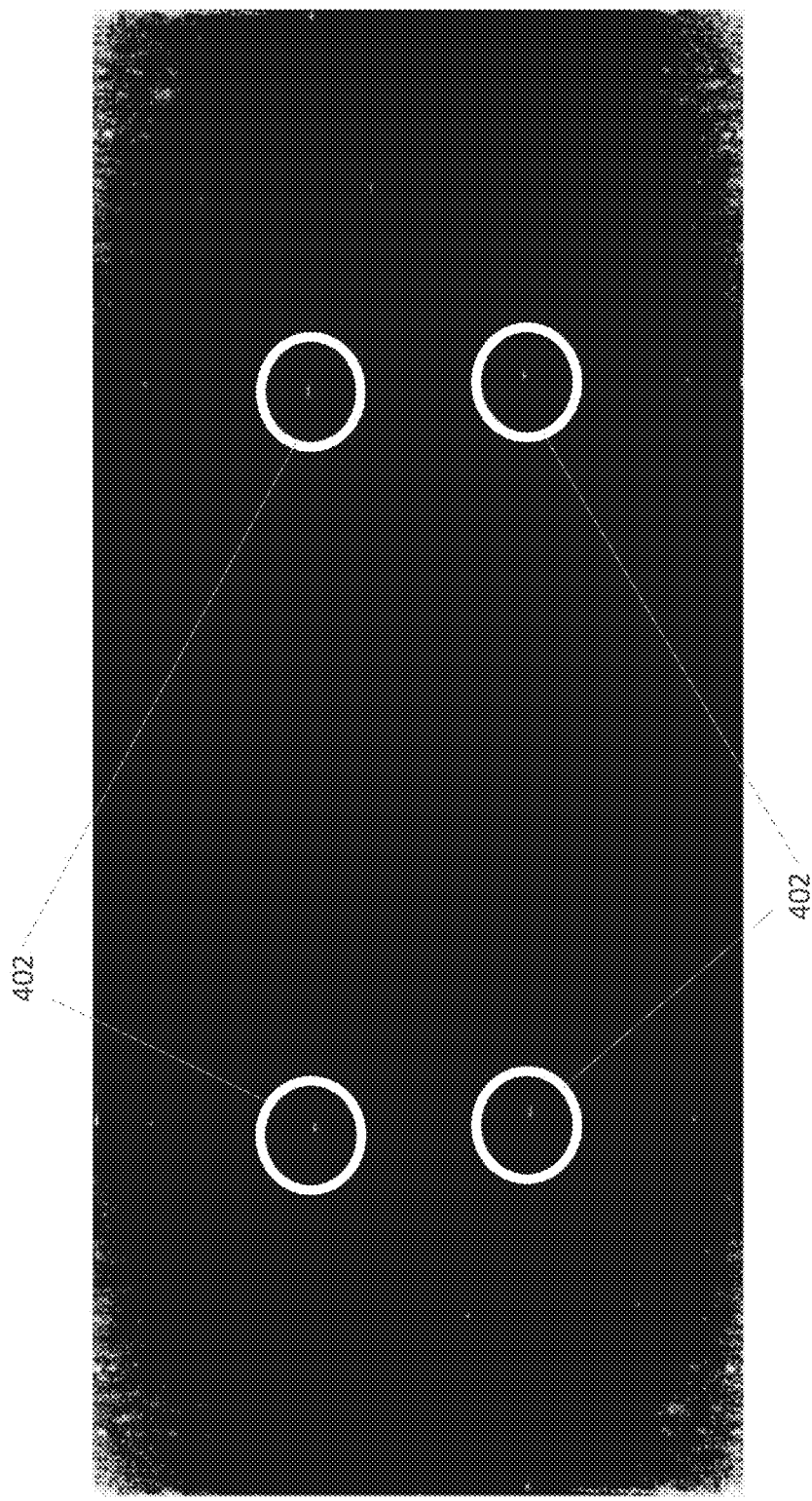
FIG. 4B shows the representation of the binarised frequency matrix of a photocopy, wherein the weakened frequency maximums are shown.

After applying the logarithm, the matrix is binarised by making the values above half the maximum value of the matrix become one, and the values below half the maximum of the matrix become zero. FIG. 4A represents the binarised frequency matrix (value 0 is represented in black, and value 1 in white) of an original document, wherein four frequency maximums 402 are seen (highlighted inside a circle). On the contrary, FIG. 4B shows the binarised frequency matrix of a photocopy, wherein the four weakest frequency maximums 402 can be seen, with less intensity (they occupy less area, occupy fewer white pixels).

Finally, to determine whether the document is a photocopy or not, the area (i.e., the number of white pixels) of the frequency maximums 402 that appear in the discrete Fourier transform of the image at the position of the marking frequency is measured, obtaining a maximum frequency value 224 for each frequency maximum. If the area of the four frequency maximums 402 (i.e., the four maximum frequency values 224) is within the threshold calculated at the time of calibration then the document is original, and if not (e.g., because at least one of said maximum frequency values 224 is outside the calibration threshold), it is a photocopy.

For example, in the case of FIG. 4A, the maximum frequency value 224 for the four frequency maximums 402 are 18, 19, 17 and 18 pixels, respectively, while the determined calibration threshold is at least 15 pixels. Since in the example of FIG. 4A all the maximum frequency values 224 are within the calibration threshold (15), the document is determined to be an original document. In the case of FIG. 4B, the maximum frequency value 224 for the four frequency maximums 402 are 11, 16, 14 and 13 pixels, respectively. As in this example of FIG. 4B not all the maximum frequency values 224 are within the calibration threshold (15), since three of them are outside said threshold, the document is determined to be a photocopied document.

Next, the embedding of the digital watermark in the digital document 302 is explained in detail, according to possible preferred embodiments. The digital watermark embedding device 310 comprises a data processing unit that executes a digital watermark embedding software, which enables the digital watermark to be inserted into the digital document 302 before printing. Using stenographic techniques and cryptography (using a digital watermark private key, a unique digital watermark numeric key for each document), the digital watermark embedding device 310 is able to hide a number of bits corresponding to the mark identifier 206 (usually 32 or 64 bits) on a digital image fulfilling the following requirements:

The image is not significantly deteriorated (slight noise is perceived).

The noise cannot be replicated or inserted into another image if not through the encoder itself and a private key (it cannot be counterfeited).

Transformations can be applied to the image (compression, noise, rotation, resizing, changes in contrast, brightness and any transformation that may occur between the printing and scanning process of the image), there being a high possibility that the encoded information will be preserved.

For the same number and same private key, the noise inserted when encoding the information is uniquely distributed each time.

The document is preferably printed using black toner, and it works as follows:

An 8-bit greyscale image is created with a background colour in light tones. This background colour can be grey if more intense marking is desired.

The embedding technique is used to encode a unique number (mark identifier) which is registered in the database 306 to avoid being reused.

The image to be protected is overlaid with this image containing the digital watermark.

The resulting image is printed by the printer 320 using only monochrome toner. The top layer containing the digital watermark is visually almost imperceptible.

In the event that a digital watermark with ultraviolet ink is embedded as an additional measure of authenticity verification, the implementation using ink only visible under ultraviolet light is as follows:

An 8-bit monochrome image is created with a white background colour. It can be grey if more intense marking is desired.

The embedding technique is used to encode a unique number (ultraviolet mark identifier) which is registered in the database 306.

The resulting image is printed by the printer 320 using only a UV toner.

The top layer containing the digital watermark is visually imperceptible.

With respect to the acquisition of the image 112 from the marked printed document 102 (initial step necessary to recover the 64 bits that have been encoded as the mark identifier), the image acquisition device 110 used may be a scanner or a camera.

In the case of using a scanner, the printed image is digitised on a physical medium and the reading algorithm is applied to the digital image to recover the mark identifier 206. If it exists, the calibration parameters are searched in the database. In a first variant, the image is scanned under ultraviolet light and the ultraviolet mark is recovered. In a second variant, the document is scanned under visible light to recover the digital watermark and thus be able to search the calibration data (calibration threshold 210) in the database 306.

In the event of using a camera, the image exposed to the camera is digitised several times per second. A rectangular digital sub-image is obtained from the centre of the image.

The reading algorithm is then applied to each sub-image until the mark identifier is recovered, at which time the digitisation stops until further intervention by the user. Once the mark identifier 206 has been obtained, the frequencies thereof can be analysed and the originality thereof determined. In a first variant, when scanning the image, ultraviolet light is applied to reveal an encoded image printed in ultraviolet ink. In a second variant, the document is scanned under visible light to recover the digital watermark and thus be able to search the calibration data in the database 306.

Some of the elements used in the system for automatic identification of photocopied documents are described in detail below.

The digital watermark decryption software enables the digital watermark contained in an image to be decrypted. One version of the PC software (e.g., Windows, Linux) enables, given a scanned image in TIFF or other formats and in greyscale, the digital watermark contained in said image to be decrypted and interpreted. One version for mobile device (iOS, Android) enables the digital watermark of an image obtained through the device's camera with a resolution of at least 1280×720 pixels to be decrypted.

The software for verifying photocopied documents based on frequency analysis is capable of detecting artifacts in the image that identify it as manipulated by analysing a given image and several parameters related to it. The software is developed for a computer (Windows, Linux) and/or for a mobile device (iOS, Android).

The scanner is capable of scanning in greyscale with an 8-bit colour depth in uncompressed format, and failing that, with lossless compression (BMP, PNG, lossless TIFF, JPEG 2000 with 1:1 compression ratio). A recommended resolution of at least 200 DPI for checks and 100 DPI for A4 size documents is used. In larger documents, the resolution may be lower.

The printer 320 is preferably laser, capable of printing in greyscale. Recommended at 600 DPI for checks and 300 DPI for A4 documents.

Back-end server and database 306: A "back-end" server is responsible for managing the database 306 in which the configurations for each type of printing associated with its watermarks (including frequency) are stored. The software tools described in the solution could also be deployed on the server.

The invention claimed is:

1. A method for automatic identification of photocopied documents, comprising:
   capturing an image of a marked printed document with a digital watermark;
   obtaining, from the captured image, a calibration identifier;
   recovering, by searching a database, a calibration threshold associated with the calibration identifier;
   applying a discrete Fourier transform to the image, obtaining a frequency matrix;
   converting the frequency matrix to a logarithmic scale;
   binarizing the matrix converted to a logarithmic scale, so that the matrix values above a predetermined binarization threshold correspond to frequency maximums;
   measuring the area, defined in number of pixels, of the frequency maximums that appear in the binarized frequency matrix, obtaining a maximum frequency value for each frequency maximum;
   comparing the maximum frequency value of each frequency maximum with the calibration threshold;
   determining, on the basis of the comparison, if the marked printed document is an original document or a photocopied document.

2. The method according to claim 1, wherein the marked printed document is determined to be a photocopied document if at least one of the maximum frequency values is outside the calibration threshold.

3. The method according to claim 1, wherein obtaining the calibration identifier comprises decoding a digital watermark embedded in the image, obtaining a mark identifier; wherein the calibration identifier is the mark identifier.

4. The method according to claim 1, comprising resizing the image to a predetermined size prior to applying the discrete Fourier transform.

5. The method according to claim 1, wherein capturing the image is carried out by means of a scanner.

6. The method according to claim 1, wherein capturing the image is carried out by means of a camera of a mobile device.

7. The method according to claim 1, further comprising:
   capturing an image of the marked printed document in the ultraviolet spectrum;
   determining that the marked printed document is a photocopied document if a digital watermark with ultraviolet ink is not detected in said image.

8. The method according to claim 1, further comprising:
   inserting a digital watermark into a digital document, wherein the digital watermark comprises at least one encoded mark identifier;
   storing the mark identifier in the database;
   printing the marked digital document, obtaining at least one printed document for calibration;
   carrying out a calibration scan of the at least one printed document for calibration;
   limiting the maximum marking frequency values obtained in the calibration scan to obtain a calibration threshold;
   storing the calibration threshold in the database, associating it with the corresponding mark identifier thereof.

9. A system for automatic identification of photocopied documents, comprising:
   an image acquisition device configured for capturing an image of a marked printed document with a digital watermark;
   a photocopied document identification device comprising a data processing unit configured for:
   receiving the image captured by the image acquisition device;
   obtaining, from the image, a calibration identifier;
   recovering, by searching a database, a calibration threshold associated with the calibration identifier;
   applying a discrete Fourier transform to the image, obtaining a frequency matrix;
   converting frequency matrix to a logarithmic scale;
   binarizing the matrix converted to a logarithmic scale, so that the matrix values above a predetermined binarization threshold correspond to frequency maximums;
   measuring the area, defined in number of pixels, of the frequency maximums that appear in the binarized frequency matrix, obtaining a maximum frequency value for each frequency maximum;
   comparing the maximum frequency value of each frequency maximum with the calibration threshold;
   determining, on the basis of the comparison, if the marked printed document is an original document or a photocopied document.

10. The system according to claim 9, wherein the data processing unit of the photocopied document identification device is configured for determining that the marked printed document is a photocopied document if at least one of the maximum frequency values is outside the calibration threshold.

11. The system according to claim 9, wherein the data processing unit of the photocopied document identification device is configured for decoding a digital watermark embedded in the image, obtaining a mark identifier; wherein the calibration identifier is the mark identifier.

12. The system according to claim 9, wherein the photocopied document identification device is a computer and the image acquisition device is a scanner.

13. The system according to claim 9, wherein the photocopied document identification device is a mobile device and the image acquisition device is a camera of said mobile device.

14. The system according to claim 9, wherein the data processing unit of the photocopied document identification device is configured for resizing the image to a predetermined size prior to applying the discrete Fourier transform.

15. The system according to claim 9, comprising a UV scanner configured for capturing an image in the ultraviolet spectrum of the marked printed document;

wherein the data processing unit of the photocopied document identification device is configured for receiving said image and determining that the marked printed document is a photocopied document if a digital watermark with ultraviolet ink is not detected.

16. The system according claim 9, further comprising:
a database;
a digital watermark embedding device, configured for:
inserting a digital watermark into a digital document, wherein the digital watermark comprises at least one encoded mark identifier;
storing the mark identifier in the database;
a printer configured for printing the marked digital document, obtaining at least one printed document for calibration;
calibration equipment configured for:
carrying out a calibration scan of the at least one printed document for calibration;
limiting the maximum marking frequency values obtained in the calibration scan to obtain a calibration threshold;
storing the calibration threshold in the database, associating it with the corresponding mark identifier thereof.

* * * * *